United States Patent
Hong

(10) Patent No.: US 8,457,433 B2
(45) Date of Patent: Jun. 4, 2013

(54) METHODS AND SYSTEMS FOR IMAGE NOISE FILTERING

(75) Inventor: Wei Hong, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 540 days.

(21) Appl. No.: 12/696,005

(22) Filed: Jan. 28, 2010

(65) Prior Publication Data

US 2011/0182510 A1 Jul. 28, 2011

(51) Int. Cl.
*G06K 9/40* (2006.01)
(52) U.S. Cl.
USPC ........... 382/260; 382/274; 382/275; 382/282; 358/3.26; 358/3.27; 358/463
(58) Field of Classification Search
USPC ................. 382/160, 274, 275, 282, 284, 294, 382/260; 358/3.26, 3.27, 463
See application file for complete search history.

(56) References Cited

U.S. PATENT DOCUMENTS

| | | | | |
|---|---|---|---|---|
| 6,919,892 B1 * | 7/2005 | Cheiky et al. | ............. | 345/473 |
| 7,006,881 B1 * | 2/2006 | Hoffberg et al. | ............. | 700/83 |
| 7,124,041 B1 * | 10/2006 | Johnson et al. | ............. | 702/58 |
| 7,426,312 B2 * | 9/2008 | Dance et al. | ............. | 382/254 |
| 7,515,747 B2 * | 4/2009 | Okutomi et al. | ............. | 382/167 |
| 7,650,319 B2 * | 1/2010 | Hoffberg et al. | ............. | 706/45 |
| 7,987,003 B2 * | 7/2011 | Hoffberg et al. | ............. | 700/17 |
| 8,109,029 B1 * | 2/2012 | Sammut et al. | ............. | 42/122 |
| 8,111,307 B2 * | 2/2012 | Deever et al. | ............. | 348/246 |
| 8,179,445 B2 * | 5/2012 | Hao | ............. | 348/208.13 |

* cited by examiner

*Primary Examiner* — Yosef Kassa
(74) *Attorney, Agent, or Firm* — Mirna Abyad; W. James Brady; Frederick J. Telecky, Jr.

(57) ABSTRACT

Methods and systems for image noise filtering are provided. One method of image noise filtering includes generating a plurality of sub-images of a digital image, applying a noise filter with small support to each sub-image, and generating a filtered digital image by merging the filtered sub-images. Another method of image noise filtering includes receiving a digital image including a plurality of color channels in the Bayer domain, applying a strong noise filter to each color channel to generate filtered color channels, computing a luminance image from the digital image, applying a weak noise filter to the luminance image to generate a filtered luminance image, computing a luminance recovery factor map using the luminance image and the filtered luminance image, and computing output color channels of the digital image using the filtered color channels and the luminance recovery factor map.

16 Claims, 4 Drawing Sheets

METHODS AND SYSTEMS FOR IMAGE NOISE FILTERING

BACKGROUND OF THE INVENTION

Images (i.e., single photographs or frames/pictures in video sequences) captured by imaging sensors in digital cameras often contain large amounts of random noise, especially in low-light conditions, that degrades image quality. For example, the noise may adversely affect the quality of the output of image processing tasks performed in the Bayer domain, such as color correction and demosaicing. In another example, as imaging sensor technology improves, the resolution of the captured images increases. When the resolution increases, the pixel size becomes smaller and the spatial frequency of the noise in the captured images becomes lower. Low frequency spatial noise may severely affect image quality, especially in the chroma channel.

Typically, one or more image noise filters are applied to the captured images at various points (e.g., in the Bayer domain and/or the color space domain (e.g., YCbCr or YUV)) during the processing of the images to reduce the noise and improve visual quality. For example, a spatial filter may be applied in the color space domain to reduce low-frequency noise. Typically, a spatial filter with large spatial support is needed to remove low-frequency noise. However, this type of filter is expensive to implement. One known approach is to downsample the image to reduce the resolution and then apply a spatial filter with small support to the downsampled image. This approach is effective for reducing low-frequency noise but when the filtered image is upsampled to the original resolution, the high frequency part of the image is lost. Further, if this approach is used in the chroma channel, color-bleeding artifacts may occur in the image.

In another example, a noise filter may be applied in the Bayer domain. One known approach is to convert a captured image from the Bayer domain to the color space domain, apply separate noise filters to the luminance and chrominance channels, and convert the filtered image back to the Bayer domain for further processing such as color correction and demosaicing. However, this approach is computationally expensive. Another known approach is to apply a noise filter directly to image in the Bayer domain without separation of the luminance and chrominance information. If a strong noise filter is applied, the strong chrominance noise is reduced but luminance detail is lost. If a weak noise filter is applied, the strong chrominance noise is not suppressed.

Accordingly, improvements in image noise filtering in order to improve the quality of images captured by a digital camera are desirable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
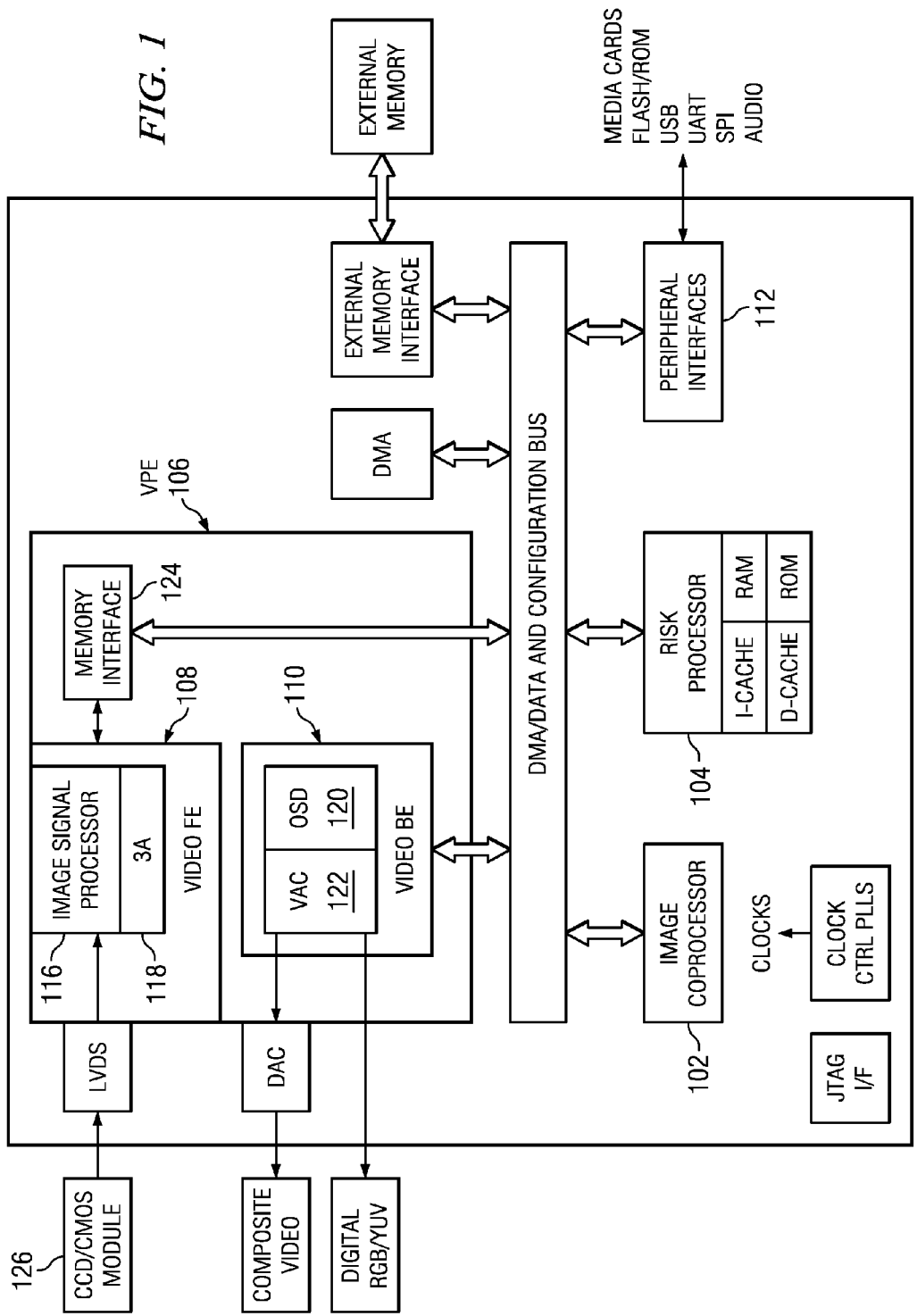
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless connection. Thus, if a first device or component couples to a second device or component, that connection may be through a direct connection, through an indirect connection via other devices and connections, through an optical connection, and/or through a wireless connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, combined, and/or performed in a different order than the order shown in the figures and/or described herein. Accordingly, embodiments of the invention should not be considered limited to the specific ordering of steps shown in the figures and/or described herein.

In general, embodiments of the invention provide methods and systems for image noise filtering in digital systems that capture digital images. A digital image is a block of pixels such as single photograph, a subset of a photograph, a frame (or other subset) of a digital video sequence, etc. In some embodiments of the invention, a noise filter with small support is applied to captured digital images to remove low-frequency noise without loss of the high frequency parts of the images. In some embodiments of the invention, an image noise filter is applied to captured digital images in the Bayer domain to suppress strong chrominance noise without destroying luminance detail. This image noise filter may be equivalent to applying strong filtering to chrominance channels and weak filtering to the luminance channel in the color space domain (e.g., YCbCr or YUV) without requiring conversion from the Bayer domain to the color space domain.

FIG. 1 shows a digital system suitable for an embedded system (e.g., a digital camera) in accordance with one or more embodiments of the invention that includes, among other components, a DSP-based image coprocessor (ICP) (102), a RISC processor (104), and a video processing engine (VPE) (106) that may be configured to perform the image noise filtering methods described herein. The RISC processor (104) may be any suitably configured RISC processor. The VPE (106) includes a configurable video processing front-end (Video FE) (108) input interface used for video capture from imaging peripherals such as image sensors, video decoders, etc., a configurable video processing back-end (Video BE) (110) output interface used for display devices such as SDTV displays, digital LCD panels, HDTV video encoders, etc, and memory interface (124) shared by the Video FE (108) and the Video BE (110). The digital system also includes peripheral interfaces (112) for various peripherals that may include a multi-media card, an audio serial port, a Universal Serial Bus (USB) controller, a serial port interface, etc.

The Video FE (108) includes an image signal processor (ISP) (116), and a 3A statistic generator (3A) (118). The ISP (116) provides an interface to image sensors and digital video sources. More specifically, the ISP (116) may accept raw image/video data from a sensor module (126) (e.g., CMOS or CCD) and can accept YUV video data in numerous formats. The ISP (116) also includes a parameterized image processing module with functionality to generate image data in a color format (e.g., RGB) from raw CCD/CMOS data. The ISP (116) is customizable for each sensor type and supports video frame rates for preview displays of captured digital images and for video recording modes. The ISP (116) also includes, among other functionality, an image resizer, statistics collection functionality, and a boundary signal calculator. The 3A module (118) includes functionality to support control loops for auto focus, auto white balance, and auto exposure by collecting metrics on the raw image data from the ISP (116) or external memory. In one or more embodiments of the invention, the Video FE (108) is configured to perform one or more image noise filtering methods as described herein.

The Video BE (110) includes an on-screen display engine (OSD) (120) and a video analog encoder (VAC) (122). The OSD engine (120) includes functionality to manage display data in various formats for several different types of hardware display windows and it also handles gathering and blending of video data and display/bitmap data into a single display window before providing the data to the VAC (122) in a color space format (e.g., RGB, YUV, YCbCr). The VAC (122) includes functionality to take the display frame from the OSD engine (120) and format it into the desired output format and output signals required to interface to display devices. The VAC (122) may interface to composite NTSC/PAL video devices, S-Video devices, digital LCD devices, high-definition video encoders, DVI/HDMI devices, etc.

The memory interface (124) functions as the primary source and sink to modules in the Video FE (108) and the Video BE (110) that are requesting and/or transferring data to/from external memory. The memory interface (124) includes read and write buffers and arbitration logic.

The ICP (102) includes functionality to perform the computational operations required for compression and other processing of captured images. The video compression standards supported may include, for example, one or more of the JPEG standards, the MPEG standards, and the H.26x standards. In one or more embodiments of the invention, the ICP (102) may be configured to perform computational operations of methods for image noise filtering as described herein.

In operation, to capture a photograph or video sequence, video signals are received by the video FE (108) and converted to the input format needed to perform video compression. Prior to the compression, one or more methods for image noise filtering as described herein may be applied as part of processing the captured video data. The video data generated by the video FE (108) is stored in the external memory. The video data is then encoded, i.e., compressed. During the compression process, the video data is read from the external memory and the compression computations on this video data are performed by the ICP (102). The resulting compressed video data is stored in the external memory. The compressed video data is then read from the external memory, decoded, and post-processed by the video BE (110) to display the image/video sequence.

Figure 2:
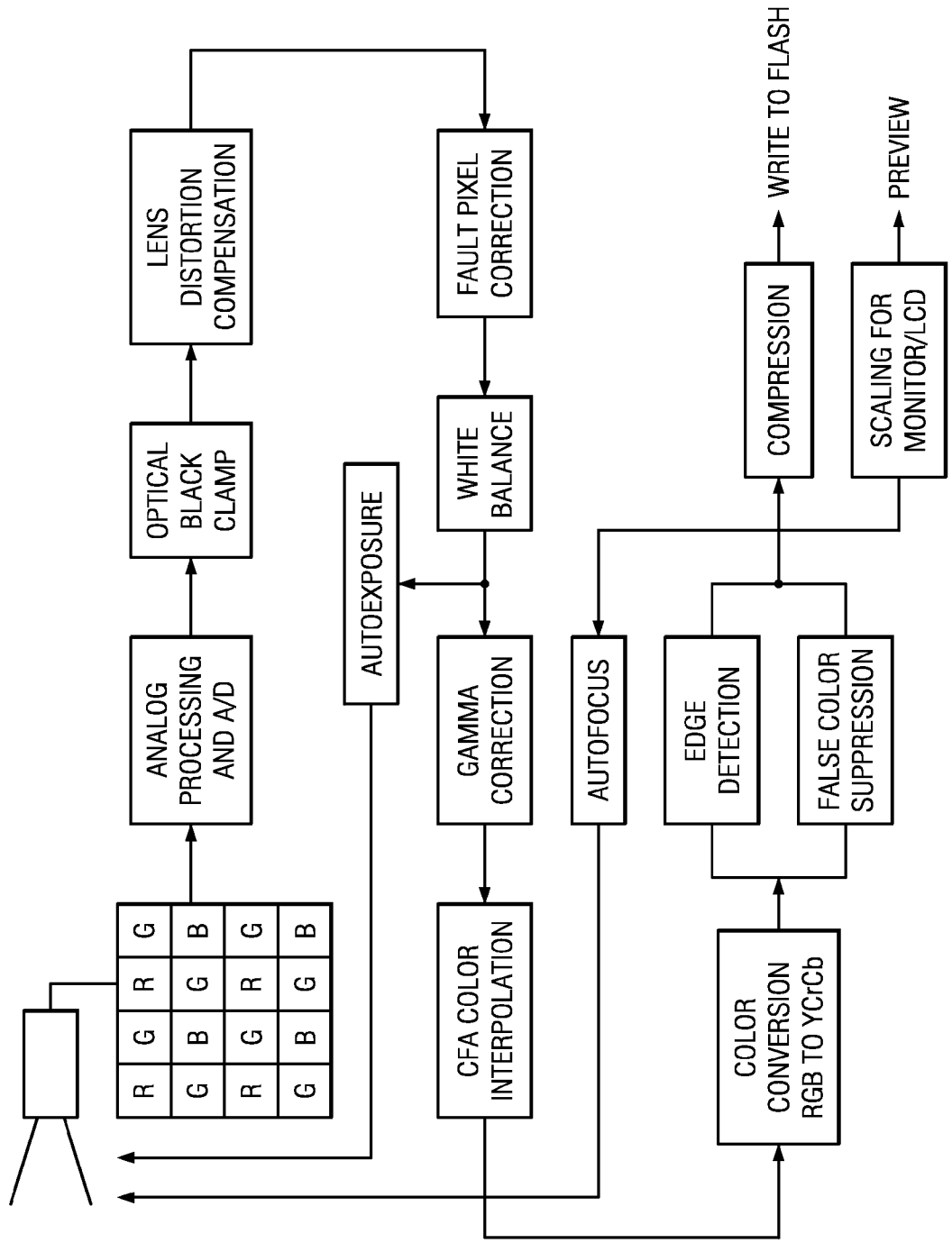
FIG. 2 shows a block diagram of an image processing pipeline in accordance with one or more embodiments of the invention.

FIG. 2 is a block diagram illustrating digital camera control and image processing (the "image pipeline") in accordance with one or more embodiments of the invention. One of ordinary skill in the art will understand that similar functionality may also be present in other digital systems (e.g., a cell phone, PDA, a desktop or laptop computer, etc.) capable of capturing digital photographs and/or digital video sequences. The automatic focus, automatic exposure, and automatic white balancing are referred to as the 3A functions; and the image processing includes functions such as color filter array (CFA) interpolation, gamma correction, white balancing, color space conversion, and compression/decompression (e.g., JPEG for single photographs and MPEG for video sequences). A brief description of the function of each block in accordance with one or more embodiments is provided below. Note that the typical color image sensor (e.g., CMOS or CCD) includes a rectangular array of photosites (i.e., pixels) with each photosite covered by a filter (the CFA): typically, red, green, or blue. In the commonly-used Bayer pattern CFA, one-half of the photosites are green, one-quarter are red, and one-quarter are blue.

To optimize the dynamic range of the pixel values represented by the imager of the digital camera, the pixels representing black need to be corrected since the imager still records some non-zero current at these pixel locations. The black clamp function adjusts for this difference by subtracting an offset from each pixel value, but clamping/clipping to zero to avoid a negative result.

Imperfections in the digital camera lens introduce nonlinearities in the brightness of the image. These nonlinearities reduce the brightness from the center of the image to the border of the image. The lens distortion compensation function compensates for the lens by adjusting the brightness of each pixel depending on its spatial location.

Photosite arrays having large numbers of pixels may have defective pixels. The fault pixel correction function interpolates the missing pixels with an interpolation scheme to provide the rest of the image processing data values at each pixel location.

The illumination during the recording of a scene is different from the illumination when viewing a picture. This results in a different color appearance that is typically seen as the bluish appearance of a face or the reddish appearance of the sky. Also, the sensitivity of each color channel varies such that grey or neutral colors are not represented correctly. The white balance function compensates for these imbalances in colors by computing the average brightness of each color component and by determining a scaling factor for each color component. Since the illuminants are unknown, a frequently used technique just balances the energy of the three colors. This equal energy approach requires an estimate of the unbalance between the color components.

Due to the nature of a color filter array, at any given pixel location, there is only information regarding one color (R, G, or B in the case of a Bayer pattern). However, the image pipeline needs full color resolution (R, G, and B) at each pixel in the image. The CFA color interpolation function reconstructs the two missing pixel colors by interpolating the neighboring pixels.

Display devices used for image-viewing and printers used for image hardcopy have a nonlinear mapping between the image gray value and the actual displayed pixel intensities. The gamma correction function (also referred to as adaptive gamma correction, tone correction, tone adjustment, contrast/brightness correction, etc.) compensates for the differences between the images generated by the image sensor and the image displayed on a monitor or printed into a page.

Typical image-compression algorithms such as JPEG operate on the YCbCr color space. The color space conversion function transforms the image from an RGB color space to a YCbCr color space. This conversion may be a linear transformation of each Y, Cb, and Cr value as a weighted sum of the R, G, and B values at that pixel location.

The nature of CFA interpolation filters introduces a low-pass filter that smoothes the edges in the image. To sharpen the images, the edge detection function computes the edge magnitude in the Y channel at each pixel. The edge magnitude is then scaled and added to the original luminance (Y) image to enhance the sharpness of the image.

Edge enhancement is only performed in the Y channel of the image. This leads to misalignment in the color channels at the edges, resulting in rainbow-like artifacts. The false color suppression function suppresses the color components, Cb and Cr, at the edges reduces these artifacts.

The autofocus function automatically adjusts the lens focus in a digital camera through image processing. These autofocus mechanisms operate in a feedback loop. They perform image processing to detect the quality of lens focus and move the lens motor iteratively until the image comes sharply into focus.

Due to varying scene brightness, to get a good overall image quality, it is necessary to control the exposure of the image sensor. The autoexposure function senses the average scene brightness and appropriately adjusting the image sensor exposure time and/or gain. Similar to autofocus, this operation is also in a closed-loop feedback fashion.

Most digital cameras are limited in the amount of memory available on the camera; hence, the image compression function is employed to reduce the memory requirements of captured images and to reduce transfer time.

In one or more embodiments of the invention, the methods for image noise filtering as described herein may be performed after optical black clamp, lens distortion compensation, or fault pixel correction. In addition, embodiments of the method of FIG. 3 may be performed after color conversion RGB to YCrCb or edge detection/false color suppression.

Figure 3:
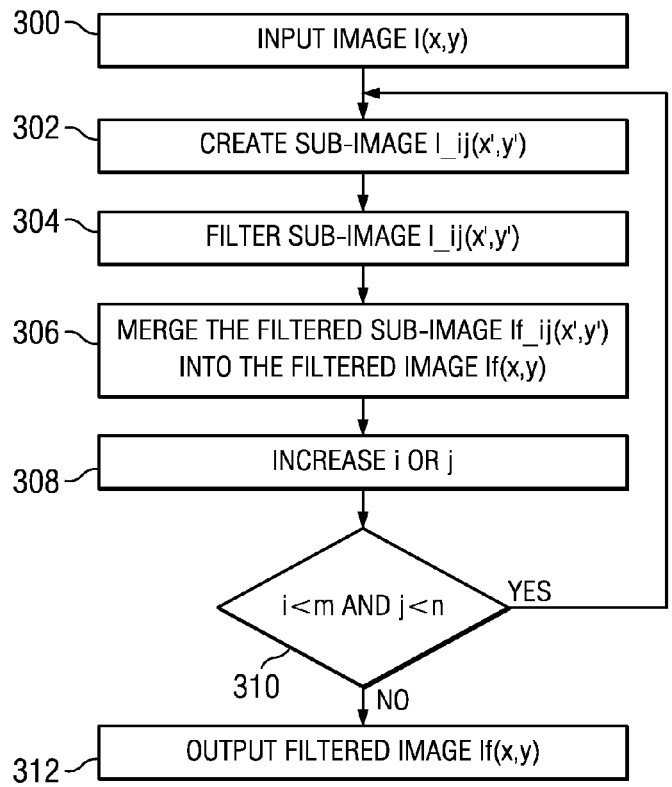
FIGS. 3 and 5 show flow diagrams of methods in accordance with one or more embodiments of the invention.

FIG. 3 is a flow graph of a method for image noise filtering in accordance with one or more embodiments of the invention. The method may be applied to a captured digital image in the color space domain or in the Bayer domain. In this method, a noise filter with small support is applied to each color channel (R, Gr, Gb, B) or (R, G, B) of a digital image to reduce the low-frequency noise without damaging the high frequency part of the digital image. In some embodiments of the invention, the method is applied to each color channel sequentially. In one or more embodiments of the invention, the method may be applied to two or more color channels concurrently.

As shown in FIG. 3, the digital image in each color channel is denoted as a two dimensional matrix $I(x, y)$, $x=0 \ldots W-1$, $y=0 \ldots H-1$, where W is the width of the image in pixels and H is the height of the image in pixels (300). In general, the digital image is divided into sub-images of size W/m pixels× H/n pixels where m is a horizontal sub-sampling factor and n is a vertical sub-sampling factor. Each W/m×H/n sub-image is filtered with a small support noise filter of size $s1 \times s2$, and the filtered sub-images are merged to generate a filtered image of size W×H. The values of m and n may be determined empirically by tuning for m and n for each image sensor at each lighting condition. The lower the noise frequency, the larger the value of m and n that may be chosen. The values of s1 and s2 may be determined by implementation cost.

Figure 4:
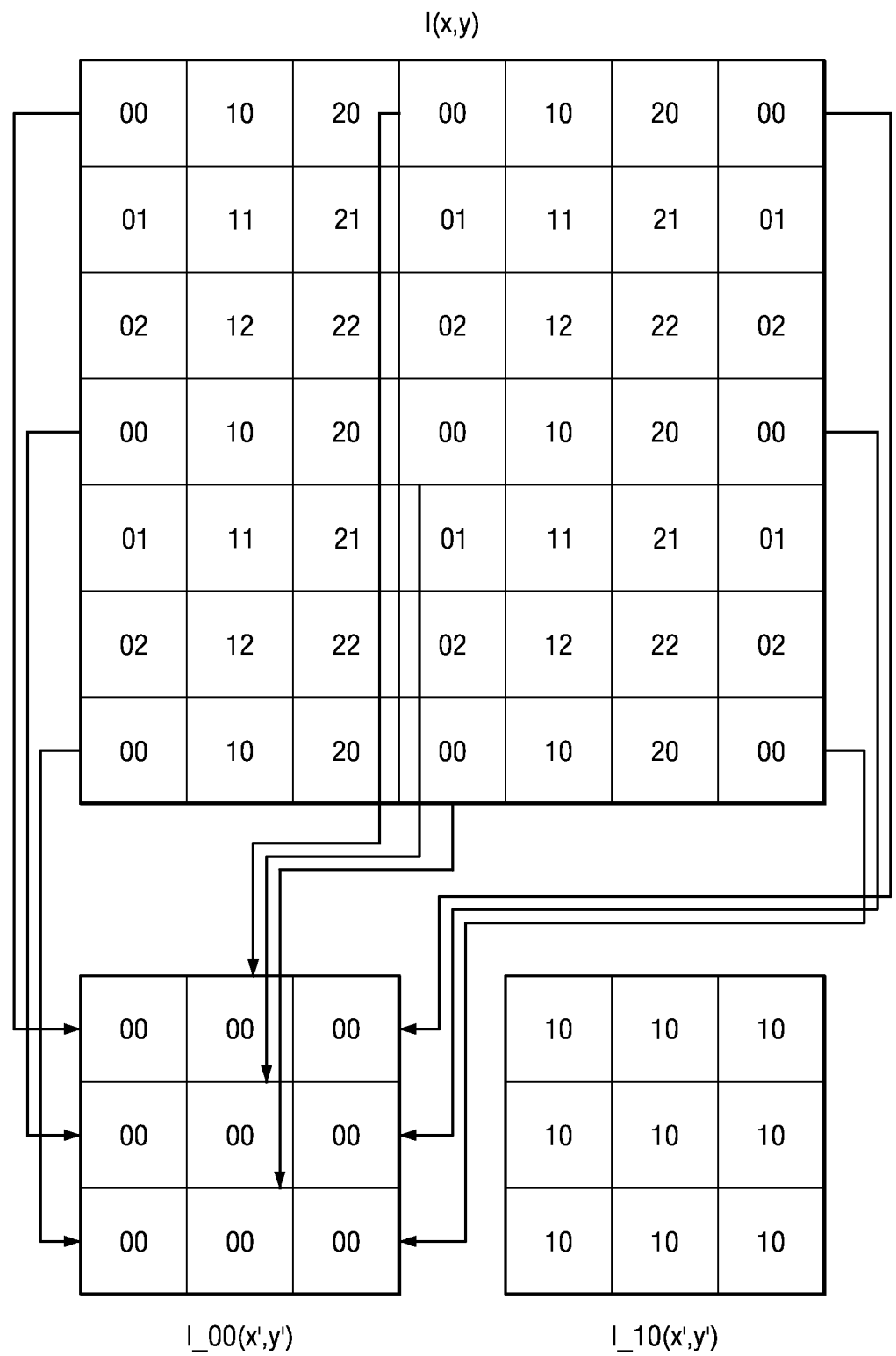
FIG. 4 shows an example in accordance with one or more embodiments of the invention.

More specifically, a sub-image $I\_ij(x',y')$ is created from the digital image $I(x, y)$ where $x'=0 \ldots W/m-1$ and $y'=0 \ldots H/n-1$ (302). In some embodiments of the invention, the sub-image $I\_ij(x',y')$ is generated as $I\_ij(x',y')=I(x'*m+i, y'*n+j)$ for $x'=0 \ldots W/m-1$, $y'=0 \ldots H/n-1$. FIG. 4 shows an example of generation of sub-images from a digital image where W=7, H=7, m=3 and n=3. The generated sub-image $I\_ij(x',y')$ is then filtered by applying a noise filter $F(x, y)$ with small support $s1 \times s2$ to the sub-image to generate a filtered sub-image $If\_ij(x',y')$ (304). Any suitable noise filter with small support may be used such as, for example, a bilateral filter or a wavelet filter. In one or more embodiments of the invention, a filter with small support is any filter in which s1 and/or s2 are less than or equal to thirty-one (31). Any filter larger than 31×31 is a filter with large support.

The filtered sub-image $If\_ij(x',y')$ is then merged into a filtered image $If(x,y)$. The merging may be expressed as $If(x'*m+i, y'*n+j)=If\_ij(x',y')$. That is, the filtered pixels in the sub-image are merged into the filtered image at the same locations as the corresponding unfiltered pixels in the original digital image. The process of creating a sub-image, filtering the sub-image, and merging the filtered sub-image into a filtered image is repeated for all $(i, j)$, $i=0 \ldots m-1$, $j=0 \ldots n-1$, i.e., until m×n sub-images are processed (308, 310). Finally, the filtered image $If\_ij(x',y')$ is output for further image processing (312).

The equivalent support of this method is $s1*m$ by $s2*n$ which is much larger than the support of $F(x,y)$. Thus, the method is effective to remove low-frequency noise. Note that only one filter $F(x,y)$ with small support s1 by s2 needs to be implemented, making the implementation cost low as compared to an equivalent filter with large support. In addition, the high frequency of the digital image is preserved so that artifacts such as color bleeding may be avoided.

The method of FIG. 3 only reduces low-frequency noise in digital images. However, in one or more embodiments of the invention, a high-frequency noise filter $G(x,y)$ may be cascaded with the low-frequency noise filtering to reduce both high-frequency and low-frequency noise. $G(x,y)$ may be applied to the digital image either before or after the method of FIG. 3.

Figure 5:
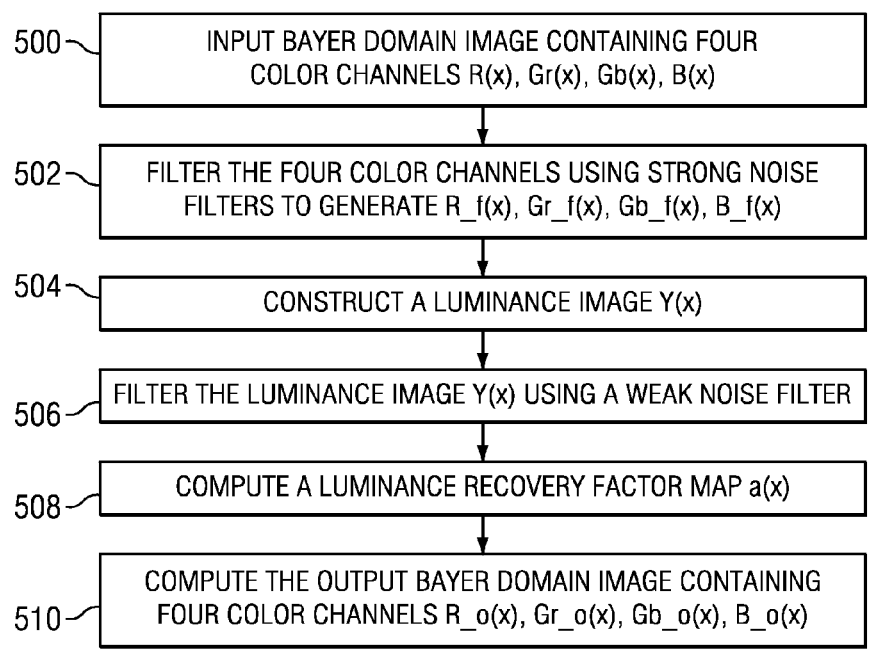

FIG. 5 is a flow graph of a method for image noise filtering in accordance with one or more embodiments of the invention. Each color channel (R, Gr, Gb, B) in a digital image contains both luminance and chrominance information. Typically, a noisy image in the YCbCr domain has a relatively small noise level in the luminance channel (Y channel) and a relatively large noise level in chrominance channels (Cb and Cr channels). So, ideally, a weak noise filter is needed for the luminance channel and a strong noise filter is needed for the chrominance channels. The noise filtering method of FIG. 5 is applied to a digital image in the Bayer domain to suppress strong chrominance noise without destroying luminance detail. This method is equivalent to applying strong noise filtering to the chrominance channels and weak noise filtering to the luminance channel in YCbCr domain.

In the method of FIG. 5, a Bayer domain digital image with four color channels denoted as $R(x,y)$, $Gr(x,y)$, $Gb(x,y)$, and $B(x,y)$ is received (500). The pixels in each of the four color channels $R(x,y)$, $Gr(x,y)$, $Gb(x,y)$, $B(x,y)$ are first filtered with strong noise filters that suppress strong chrominance noise to generate filtered color channels $R\_f(x,y)$, $Gr\_f(x,y)$, $Gb\_f(x,y)$, $B\_f(x,y)$ (502). This filtering may be denoted as $$R\_f(x,y)=F\_r(R(x,y), S\_r)$$

$$Gr\_f(x,y)=F\_gr(Gr(x,y), S\_gr)$$

$$Gb\_f(x,y) = F\_gb(Gb(x,y), S\_gb)$$

$$B\_f(x,y) = F\_b(B(x,y), S\_b)$$

where S_r, S_gr, S_gb, and S_b are the respective strength parameters of the four noise filters F_r, F_gr, F_gb, and F_b. The noise filters may be any suitable parameterized noise filter, such as, for example, a wavelet filter or a bilateral filter. In some embodiments of the invention, the same type of filter is applied to all color channels. The strength parameters may be the same or may differ. However, in each instance, the strength parameter should be a sufficiently large value to suppress strong chrominance noise in the respective color channel. In some embodiments of the invention, the values of the strength parameters are determined empirically by tuning to determine values for each imaging sensor at each lighting condition.

The use of the strong filters tends to kill luminance details so the method compensates for the loss of luminance detail. First, a luminance image Y(x,y) is constructed from the original digital image (504). In one or more embodiments of the invention, the luminance image is constructed as Y(x,y)=(R(x,y)+Gr(x,y)+Gb(x,y)+B(x,y))/4. That is, each pixel in the luminance image is the average of the corresponding pixels in the four color channels. The pixels in the luminance image Y(x,y) are then filtered using a weak noise filter to generate a filtered luminance image Y_f(x,y) (506). This filtering may be denoted as Y_f(x,y)=F_y(Y(x,y), S_y) where S_y is the strength of the noise filter F_y. The noise filter may be any suitable parameterized noise filter, such as, for example, a wavelet filter or a bilateral filter, and is of the same type as the noise filter applied to the color channels. The strength parameter S_y has a value smaller than the strength parameters S_r, S_gr, S_gb, S_b of the noise filters applied to the color channels. In some embodiments of the invention, the values of the strength parameters are determined empirically by tuning to determine values for each imaging sensor at each lighting condition.

Next, a luminance recovery factor map a(x,y) is computed using the luminance image Y(x,y) and the filtered luminance image Y_f(x,y) (508). Each entry in the luminance recovery factor map a(x,y) may be computed as Y(x,y)/(Y_f(x,y)+b) where b is a very small number (e.g., 0.000001) that prevents the denominator from being zero.

Finally, the four color channels of the output Bayer domain digital image, denoted as R_o(x,y), Gr_o(x,y), Gb_o(x,y), B_o(x,y), are computed using the filtered color channels R_f(x,y), Gr_f(x,y), Gb_f (x,y), B_f (x,y) and the luminance recovery factor map a(x,y) (510). More specifically, the pixels in the output color channels are computed as $$R\_o(x,y) = R\_f(x,y) * a(x,y)$$

$$Gr\_o(x,y) = Gr\_f(x,y) * a(x,y)$$

$$Gb\_o(x,y) = Gb\_f(x,y) * a(x,y)$$

$$B\_o(x,y) = B\_f(x,y) * a(x,y)$$

The equivalent filtering strength of this noise filtering method on luminance can be approximated as (S_r+S_gr+S_gb+S_b)/4−S_y. Thus, to retain more luminance details, S_y can be increased. To smooth out more luminance noise, S_y can be decreased. By tuning S_r, S_gr, S_gb, S_b and S_y, this method for noise filtering in Bayer domain can be made equivalent to one in YCbCr domain with different filtering strength between luminance and chrominance channels.

In one or more embodiments of the invention, the methods of FIG. 3 and FIG. 5 may be used together. In some embodiments of the invention, when the two methods are used together, the method of FIG. 5 is applied as the filter with small support F(x, y) (304 in FIG. 3). In some embodiments of the invention, the method of FIG. 5 is applied in the Bayer domain and the method of FIG. 3 is applied in the color space domain.

Embodiments of the methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing including embodiments of the methods for image noise filtering described herein. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

Embodiments of the methods described herein may be implemented in hardware, software, firmware, or any combination thereof. If implemented at least partially in software, the software may be executed in one or more processors, such as a microprocessor, application specific integrated circuit (ASIC), field programmable gate array (FPGA), or digital signal processor (DSP). The software embodying the methods may be initially stored in a computer-readable medium (e.g., memory, flash memory, a DVD, etc.) and loaded and executed by a processor. Further, the computer-readable medium may be accessed over a network or other communication path for downloading the software. In some cases, the software may also be provided in a computer program product, which includes the computer-readable medium and packaging materials for the computer-readable medium.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. It is therefore contemplated that the appended claims will cover any such modifications of the embodiments as fall within the true scope and spirit of the invention.

What is claimed is:

1. A method of image noise filtering comprising:
generating a plurality of sub-images of a digital image;
applying a noise filter with small support to each sub-image; and
generating a filtered digital image by merging the filtered sub-images, wherein generating a plurality of sub-images comprises generating each sub-image I $ij(x',y')$ as $I_{13}$ ij(x',y')=I(x'*m+i,y'*n+j) for x'=0 ... W/m−1, y'=0 ... H/n−1 wherein W is a width in pixels in the digital image I(x, y), H is a height in pixels of the digital image I(x, y), m is a horizontal sub-sampling factor of each sub-image, n is a vertical sub-sampling factor of each sub-image, i=0 ... m−1, and j=0 ... n−1.

2. The method of claim 1, wherein generating a filtered digital image comprises merging each filtered sub-image If_ij (x',y') into the filtered digital image If(x, y) as If(x'*m+i,y'*n+j)=If_ij(x',y').

3. The method of claim 1, wherein the noise filter with small support is a noise filter of size s1×s2 where s1 is less than or equal to 31 and s2 is less than or equal to 31.

4. The method of claim 1, wherein applying a noise filter comprises:
applying a strong noise filter to each color channel in a sub-image to generate filtered color channels, wherein chrominance noise in each color channel is suppressed in the corresponding filtered color channel;
computing a luminance image from the sub-image;
applying a weak noise filter to the luminance image to generate a filtered luminance image;
computing a luminance recovery factor map using the luminance image and the filtered luminance image; and
computing output color channels of the sub-image using the filtered color channels and the luminance recovery factor map.

5. The method of claim 4, wherein computing a luminance image comprises computing each pixel of the luminance image as an average of corresponding pixels in the color channels of the digital image.

6. The method of claim 5, wherein computing a luminance recovery factor map comprises computing each entry x in the luminance recovery factor map as $Y(x,y)/(Y\_f(x,y)+b)$ where b a number selected to prevent division by zero, $Y(x,y)$ is a corresponding pixel in the luminance image and $Y\_f(x,y)$ is a corresponding pixel in the filtered luminance image.

7. The method of claim 6, wherein computing output color channels comprises for each filtered color channel, multiplying each pixel in the filtered color channel by a corresponding entry in the luminance recovery factor map.

8. A method of image noise filtering comprising:
receiving a digital image comprising a plurality of color channels in the Bayer domain;
applying a strong noise filter to each color channel to generate filtered color channels, wherein chrominance noise in each color channel is suppressed in the corresponding filtered color channel;
computing a luminance image from the digital image;
applying a weak noise filter to the luminance image to generate a filtered luminance image;
computing a luminance recovery factor map using the luminance image and the filtered luminance image;
computing output color channels of the digital image using the filtered color channels and the luminance recovery factor map
generating a plurality of sub-images of the digital image;
applying a noise filter with small support to each sub-image; and
generating a filtered digital image by merging the filtered sub-images, wherein generating a plurality of sub-images comprises generating each sub-image $I\_ij(x',y')$ as $I\_ij(x',y')=I(x'*m+i,y'*n+j)$ for $x'=0 \ldots W/m-1$, $y'=0 \ldots H/n-1$ wherein W is a width in pixels in the digital image $I(x, y)$, H is a height in pixels of the digital image $I(x, y)$, m is a horizontal sub-sampling factor of each sub-image, n is a vertical sub-sampling factor of each sub-image, $i=0 \ldots m-1$, and $j=0 \ldots n-1$.

9. The method of claim 8, wherein computing a luminance image comprises computing each pixel of the luminance image as an average of corresponding pixels in the color channels of the digital image.

10. The method of claim 9, wherein computing a luminance recovery factor map comprises computing each entry x in the luminance recovery factor map as $Y(x,y)/(Y\_f(x,y)+b)$ where b a number selected to prevent division by zero, $Y(x,y)$ is a corresponding pixel in the luminance image and $Y\_f(x,y)$ is a corresponding pixel in the filtered luminance image.

11. The method of claim 10, wherein computing output color channels comprises for each filtered color channel, multiplying each pixel in the filtered color channel by a corresponding entry in the luminance recovery factor map.

12. The method of claim 8, wherein generating a filtered digital image comprises merging each filtered sub-image $If\_ij(x',y')$ into the filtered digital image $If(x, y)$ as $If(x'*m+i,y'*n+j)=If\_ij(x',y')$.

13. The method of claim 8, wherein the noise filter with small support is a noise filter of size s1×s2 where s1 is less than or equal to 31 and s2 is less than or equal to 31.

14. A digital system comprising:
a processor; and
a memory storing software instructions, wherein when executed by the digital signal processor, the software instructions cause the digital system to perform a method comprising:
generating a plurality of sub-images of a digital image;
applying a noise filter with small support to each sub-image; and
generating a filtered digital image by merging the filtered sub-image, wherein generating a plurality of sub-images comprises generating each sub-image $I\_ij(x',y')$ as $I\_ij(x',y')=I(x'*m+i,y'*n+j)$ for $x'=0 \ldots W/m-1$, $y'=0 \ldots H/n-1$ wherein W is a width in pixels in the digital image $I(x, y)$, H is a height in pixels of the digital image $I(x, y)$, m is a horizontal sub-sampling factor of each sub-image, n is a vertical sub-sampling factor of each sub-image, $i=0 \ldots m-1$, and $j=0 \ldots n-1$.

15. The digital system of claim 14, wherein generating a filtered digital image comprises merging each filtered sub-image $If\_ij(x',y')$ into the filtered digital image $If(x, y)$ as $If(x'*m+i,y'*n+j)=If\_ij(x',y')$.

16. The digital system of claim 14, wherein the noise filter with small support is a noise filter of size s1×s2 where s1 is less than or equal to 31 and s2 is less than or equal to 31.

* * * * *